US012761041B2

(12) United States Patent
Bennati et al.

(10) Patent No.: US 12,761,041 B2
(45) Date of Patent: Oct. 13, 2026

(54) METHOD, APPARATUS, AND COMPUTER PROGRAM PRODUCT FOR ANONYMIZING TRAJECTORIES

(71) Applicant: HERE GLOBAL B.V., Eindhoven (NL)

(72) Inventors: Stefano Bennati, Zurich (CH); Johannes Braese, Berlin (DE); Elena Vidyakina, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 282 days.

(21) Appl. No.: 18/175,037

(22) Filed: Feb. 27, 2023

(65) Prior Publication Data

US 2024/0288279 A1 Aug. 29, 2024

(51) Int. Cl.
*G01C 21/00* (2006.01)

(52) U.S. Cl.
CPC ..... *G01C 21/3819* (2020.08); *G01C 21/3841* (2020.08)

(58) Field of Classification Search
CPC G01C 21/3819; G01C 21/3841; G01C 21/26; G06F 2221/2111; G06F 2221/2151;
(Continued)

(56) References Cited

U.S. PATENT DOCUMENTS 9,097,542 B2 8/2015 Morlock et al.
9,460,311 B2 * 10/2016 Bezzi .................. G06F 21/6227
(Continued)

FOREIGN PATENT DOCUMENTS

CN 106992991 A 7/2017
CN 112700637 A 4/2021
(Continued)

OTHER PUBLICATIONS

Bennati et al., "Modelling imperfect knowledge via location semantics for realistic privacy risks estimation in trajectory data", Scientific Reports 12, Article No. 246, (Jan. 7, 2022), 10 pages.
(Continued)

*Primary Examiner* — Rachid Bendidi
*Assistant Examiner* — Joseph Anderson Yanoska
(74) *Attorney, Agent, or Firm* — Alston & Bird LLP

(57) ABSTRACT

A method, apparatus, and computer program product are provided for anonymizing a trajectory. Methods may include: receiving a sequence of probe data points defining a trajectory having an origin location and a destination location; determining, from the origin location, an origin area that includes the origin location; determining, from the destination location, a destination location that includes the destination location; determining an origin timestamp based on a first probe data point of the trajectory outside of the origin area; determining a destination timestamp based on a last probe data point of the trajectory outside of the destination area; generating a shared trajectory beginning with the first probe data point of the trajectory outside of the origin area and ending with the last probe data point of the trajectory outside of the destination area; and publishing the shared trajectory including the origin timestamp and the destination timestamp to a service provider.

20 Claims, 7 Drawing Sheets

(58) Field of Classification Search
CPC .. G06F 21/6254; G08G 1/0112; H04W 12/02; H04W 12/63
See application file for complete search history.

(56) References Cited

U.S. PATENT DOCUMENTS

| | | | | |
|---|---|---|---|---|
| 10,146,956 | B2 | 12/2018 | Boldyrev et al. | |
| 10,401,183 | B2 | 9/2019 | Biswas et al. | |
| 10,918,001 | B2 | 2/2021 | Furukawa et al. | |
| 11,151,469 | B2 | 10/2021 | Agrawal et al. | |
| 11,979,792 | B2 | 5/2024 | Matsumoto et al. | |
| 2012/0023057 | A1 | 1/2012 | Winberry et al. | |
| 2012/0259547 | A1 | 10/2012 | Morlock et al. | |
| 2014/0236719 | A1* | 8/2014 | Szostak | G01C 21/3647 705/14.54 |
| 2015/0300835 | A1 | 10/2015 | Fowe et al. | |
| 2015/0308848 | A1 | 10/2015 | Inoue et al. | |
| 2018/0066957 | A1 | 3/2018 | Stroila et al. | |
| 2018/0121483 | A1 | 5/2018 | Giurgiu et al. | |
| 2018/0188053 | A1 | 7/2018 | Fukuda et al. | |
| 2018/0268168 | A1* | 9/2018 | Herlocker | G01C 21/3811 |
| 2019/0017832 | A1 | 1/2019 | Busser | |
| 2019/0113597 | A1 | 4/2019 | Osumi | |
| 2019/0156062 | A1 | 5/2019 | Busser | |
| 2019/0383633 | A1 | 12/2019 | Choi | |
| 2020/0018607 | A1 | 1/2020 | Balu | |
| 2020/0107163 | A1 | 4/2020 | Li et al. | |
| 2020/0112832 | A1 | 4/2020 | Li et al. | |
| 2021/0108929 | A1 | 4/2021 | Zhang et al. | |
| 2021/0172759 | A1 | 6/2021 | Li et al. | |
| 2021/0383022 | A1 | 12/2021 | Bennati et al. | |
| 2022/0109947 | A1* | 4/2022 | Tinsley | H04W 4/022 |
| 2022/0136841 | A1 | 5/2022 | Bennati et al. | |
| 2022/0394425 | A1 | 12/2022 | Vidyakina et al. | |
| 2023/0098479 | A1* | 3/2023 | Chen | H04W 12/64 726/26 |
| 2023/0204382 | A1 | 6/2023 | Nutakki et al. | |

FOREIGN PATENT DOCUMENTS

| | | | | |
|---|---|---|---|---|
| CN | 112818402 | B | 5/2021 | |
| EP | 4099725 | A1 | 12/2022 | |
| JP | 2024110993 | A | 8/2024 | |
| WO | WO-2012076040 | A1 * | 6/2012 | G01C 21/3844 |
| WO | 2023131684 | A1 | 7/2023 | |

OTHER PUBLICATIONS

U.S. Appl. No. 18/175,067, filed Feb. 27, 2023, entitled "Method, Apparatus, And Computer Program Product For Anonymizing Trajectories", 40 pages.

Extended European Search Report for European Application No. 24159562.8 dated Jul. 4, 2024, 11 pages.

Extended European Search Report for European Application No. 24159563.6 dated Jun. 13, 2024, 8 pages.

Non-Final Office Action for U.S. Appl. No. 18/175,067 dated Dec. 30, 2024.

Notice of Allowance for U.S. Appl. No. 18/175,067 dated Jun. 4, 2025.

U.S. Appl. No. 19/080,147, filed Mar. 14, 2025, entitled "Method, Apparatus, And Computer Program Product For Anonymizing Destinations", 43 pages.

U.S. Appl. No. 19/079,989, filed Mar. 14, 2025, entitled "Method, Apparatus, And Computer Program Product For Density Driven Location Data Anonymization", 43 pages.

Li et al., "Privacy-Preserving Trajectory Data Publishing by Dynamic Anonymization with Bounded Distortion", ISPRS International Journal of Geo-Information 2021, 10(2), (Feb. 16, 2021), 20 pages.

Yu et al., "A Trajectory K-Anonymity Model Based on Point Density and Partition", arXiv:2307.16849v1, (Jul. 31, 2023), 13 pages.

Qin et al., "Privacy-Preserving Traffic Assignment for Multimodal Transportation Systems", Preprint submitted to Transportation Research Part C: Emerging Technologies, (Feb. 17, 2024), 38 pages.

* cited by examiner

METHOD, APPARATUS, AND COMPUTER PROGRAM PRODUCT FOR ANONYMIZING TRAJECTORIES

TECHNOLOGICAL FIELD

An example embodiment of the present disclosure relates to anonymizing trajectories of mobile devices, and more particularly, to anonymizing trajectories in a manner that reduces privacy risks while providing high utility for all use cases.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, to anonymizing trajectories in a manner that reduces privacy risks while providing high utility for all use cases. According to an example embodiment, an apparatus is provided including at least one processor and at least one memory including computer program code, the at least one memory and computer program code configured to, with the processor, cause the apparatus to at least: receive a sequence of probe data points defining a trajectory having an origin location and a destination location; determine, from the origin location, an origin area that includes the origin location; determine, from the destination location, a destination area that includes the destination location; determine an origin timestamp based on a first probe data point of the trajectory outside of the origin area; determine a destination timestamp based on a last probe data point of the trajectory outside of the destination area; generate a shared trajectory beginning with the first probe data point of the trajectory outside of the origin area and ending with the last probe data point of the trajectory outside of the destination area; and publish the shared trajectory including the origin timestamp and the destination timestamp to a location-based service provider.

According to some embodiments, the origin timestamp is determined based on a generalization of an actual timestamp of the first probe data point of the trajectory outside of the origin area, where the destination timestamp is determined based on a generalization of an actual timestamp of the last probe data point of the trajectory outside of the destination area. According to certain embodiments, the generalization of the actual timestamp of the first probe data point of the trajectory outside of the origin area includes assigning the origin timestamp to a window of time that includes the actual timestamp of the first probe data point of the trajectory outside of the origin area, and the generalization of the actual timestamp of the last probe data point of the trajectory outside of the destination area includes assigning the destination timestamp to a window of time that includes the actual timestamp of the last probe data point of the trajectory outside of the destination area. According to some embodiments, the generalization of the actual timestamp of the first probe data point of the trajectory outside of the origin area includes causing the apparatus to define a time window based on the actual timestamp of the first probe data point of the trajectory outside of the origin area, where the origin timestamp is defined as the time window.

Causing the apparatus of some embodiments to determine, from the origin location, the origin area that includes the origin location includes causing the apparatus to: determine candidate origin areas for a region based, at least in part, on a density of at least one of population, points-of-interest, or buildings; and determine the origin area from the candidate origin areas based on the origin location. Causing the apparatus of some embodiments to determine from the origin location, the origin area that includes the origin location includes causing the apparatus to: determine candidate origin areas for a region based, at least in part, on areas defined by postal code boundaries; and determine the origin area from the candidate origin areas based on the origin location. Causing the apparatus of some embodiments to determine from the origin location the origin area that includes the origin location comprises causing the apparatus to: determine candidate origin areas for a region based, at least in part, on map features comprising one or more of: geographical boundaries; topographical boundaries; roads of a road network; or bodies of water; and determine the origin area from the candidate origin areas based on the origin location. Causing the apparatus to determine, from the destination location, the destination area that includes the destination location includes, in some embodiments, causing the apparatus to: determine candidate destination areas for a region based, at least in part, on map features including one or more of: geographical boundaries, topographical boundaries, roads of a road network, bodies of water, or postal codes; and determine the destination area from the candidate destination areas based on the destination location.

Embodiments provided herein include a computer program product having at least one non-transitory computer-readable storage medium having computer-executable program code portions stored therein, the computer-executable program code portions including program code instructions to: receive a sequence of probe data points defining a trajectory having an origin location and a destination location; determine, from the origin location, an origin area that includes the origin location; determine, from the destination location, a destination area that includes the destination location; determine an origin timestamp based on a first probe data point of the trajectory outside of the origin area; determine a destination timestamp based on a last probe data point of the trajectory outside of the destination area; generate a shared trajectory beginning with the first probe data point of the trajectory outside of the origin area and ending with the last probe data point of the trajectory outside of the destination area; and publish the shared trajectory including the origin timestamp and the destination timestamp to a location-based service provider. Embodiments described herein further include a computer program product having computer-executable program code portions stored therein, the computer executable program code portions including program code instructions configured to perform any method described herein.

According to some embodiments, the origin timestamp is determined based on a generalization of an actual timestamp of the first probe data point of the trajectory outside of the origin area, where the destination timestamp is determined based on a generalization of an actual timestamp of the last probe data point of the trajectory outside of the destination area. According to certain embodiments, the generalization of the actual timestamp of the first probe data point of the trajectory outside of the origin area includes assigning the origin timestamp to a window of time that includes the actual timestamp of the first probe data point of the trajectory outside of the origin area, and the generalization of the actual timestamp of the last probe data point of the trajectory outside of the destination area includes assigning the destination timestamp to a window of time that includes the actual timestamp of the last probe data point of the trajectory outside of the destination area. According to some embodiments, the generalization of the actual timestamp of the first probe data point of the trajectory outside of the origin area includes program code instructions to define a time window based on the actual timestamp of the first probe data point of the trajectory outside of the origin area, where the origin timestamp is defined as the time window.

The program code instructions of some embodiments to determine, from the origin location, the origin area that includes the origin location include program code instructions to: determine candidate origin areas for a region based, at least in part, on a density of at least one of population, points-of-interest, or buildings; and determine the origin area from the candidate origin areas based on the origin location. The program code instructions of some embodiments to determine from the origin location, the origin area that includes the origin location include program code instructions to: determine candidate origin areas for a region based, at least in part, on areas defined by postal code boundaries; and determine the origin area from the candidate origin areas based on the origin location. The program code instructions of some embodiments to determine from the origin location the origin area that includes the origin location comprise program code instructions to: determine candidate origin areas for a region based, at least in part, on map features comprising one or more of: geographical boundaries; topographical boundaries; roads of a road network; or bodies of water; and determine the origin area from the candidate origin areas based on the origin location. The program code instructions to determine, from the destination location, the destination area that includes the destination location includes, in some embodiments, program code instructions to: determine candidate destination areas for a region based, at least in part, on map features including one or more of: geographical boundaries, topographical boundaries, roads of a road network, bodies of water, or postal codes; and determine the destination area from the candidate destination areas based on the destination location.

Embodiments provided herein include methods including: receiving a sequence of probe data points defining a trajectory having an origin location and a destination location; determining, from the origin location, an origin area that includes the origin location; determining, from the destination location, a destination area that includes the destination location; determining an origin timestamp based on a first probe data point of the trajectory outside of the origin area; determining a destination timestamp based on a last probe data point of the trajectory outside of the destination area; generating a shared trajectory beginning with the first probe data point of the trajectory outside of the origin area and ending with the last probe data point of the trajectory outside of the destination area; and publishing the shared trajectory including the origin timestamp and the destination timestamp to a location-based service provider.

According to some embodiments, the origin timestamp is determined based on a generalization of an actual timestamp of the first probe data point of the trajectory outside of the origin area, where the destination timestamp is determined based on a generalization of an actual timestamp of the last probe data point of the trajectory outside of the destination area. According to certain embodiments, the generalization of the actual timestamp of the first probe data point of the trajectory outside of the origin area includes assigning the origin timestamp to a window of time that includes the actual timestamp of the first probe data point of the trajectory outside of the origin area, and the generalization of the actual timestamp of the last probe data point of the trajectory outside of the destination area includes assigning the destination timestamp to a window of time that includes the actual timestamp of the last probe data point of the trajectory outside of the destination area. According to some embodiments, the generalization of the actual timestamp of the first probe data point of the trajectory outside of the origin area includes defining a time window based on the actual timestamp of the first probe data point of the trajectory outside of the origin area, where the origin timestamp is defined as the time window.

According to the method of some embodiments, determining, from the origin location, the origin area that includes the origin location includes: determining candidate origin areas for a region based, at least in part, on a density of at least one of population, points-of-interest, or buildings; and determining the origin area from the candidate origin areas based on the origin location. According to the method of some embodiments, determining from the origin location, the origin area that includes the origin location includes: determining candidate origin areas for a region based, at least in part, on areas defined by postal code boundaries; and determining the origin area from the candidate origin areas based on the origin location. According to some embodiments, determining from the origin location the origin area that includes the origin location includes: determining candidate origin areas for a region based, at least in part, on map features including one or more of: geographical boundaries; topographical boundaries; roads of a road network; or bodies of water; and determining the origin area from the candidate origin areas based on the origin location. According to some embodiments, determining from the origin location, the origin area that includes the origin location includes: determining candidate origin areas for a region based, at least in part, on map features including one or more of: geographical boundaries, topographical boundaries, roads of a road network, bodies of water, or postal codes; and determining the origin area from the candidate origin areas based on the origin location.

Embodiments provided herein include an apparatus including: means for receiving a sequence of probe data points defining a trajectory having an origin location and a destination location; means for determining, from the origin location, an origin area that includes the origin location; means for determining, from the destination location, a destination area that includes the destination location; means for determining an origin timestamp based on a first probe data point of the trajectory outside of the origin area; means for determining a destination timestamp based on a last probe data point of the trajectory outside of the destination area; means for generating a shared trajectory beginning with the first probe data point of the trajectory outside of the origin area and ending with the last probe data point of the trajectory outside of the destination area; and means for publishing the shared trajectory including the origin timestamp and the destination timestamp to a location-based service provider.

According to some embodiments, the origin timestamp is determined based on a generalization of an actual timestamp of the first probe data point of the trajectory outside of the origin area, where the destination timestamp is determined based on a generalization of an actual timestamp of the last probe data point of the trajectory outside of the destination area. According to certain embodiments, the generalization of the actual timestamp of the first probe data point of the trajectory outside of the origin area includes assigning the origin timestamp to a window of time that includes the actual timestamp of the first probe data point of the trajectory outside of the origin area, and the generalization of the actual timestamp of the last probe data point of the trajectory outside of the destination area includes assigning the destination timestamp to a window of time that includes the actual timestamp of the last probe data point of the trajectory outside of the destination area. According to some embodiments, the generalization of the actual timestamp of the first probe data point of the trajectory outside of the origin area includes defining a time window based on the actual timestamp of the first probe data point of the trajectory outside of the origin area, where the origin timestamp is defined as the time window.

According to the method of some embodiments, the means for determining, from the origin location, the origin area that includes the origin location includes: means for determining candidate origin areas for a region based, at least in part, on a density of at least one of population, points-of-interest, or buildings; and means for determining the origin area from the candidate origin areas based on the origin location. According to some embodiments, the means for determining from the origin location, the origin area that includes the origin location includes: means for determining candidate origin areas for a region based, at least in part, on areas defined by postal code boundaries; and means for determining the origin area from the candidate origin areas based on the origin location. According to some embodiments, the means for determining from the origin location the origin area that includes the origin location includes: means for determining candidate origin areas for a region based, at least in part, on map features including one or more of: geographical boundaries; topographical boundaries; roads of a road network; or bodies of water; and means for determining the origin area from the candidate origin areas based on the origin location. According to some embodiments, the means for determining from the origin location, the origin area that includes the origin location includes: means for determining candidate origin areas for a region based, at least in part, on map features including one or more of: geographical boundaries, topographical boundaries, roads of a road network, bodies of water, or postal codes; and means for determining the origin area from the candidate origin areas based on the origin location.

BRIEF DESCRIPTION OF THE DRAWINGS

Figure 1:
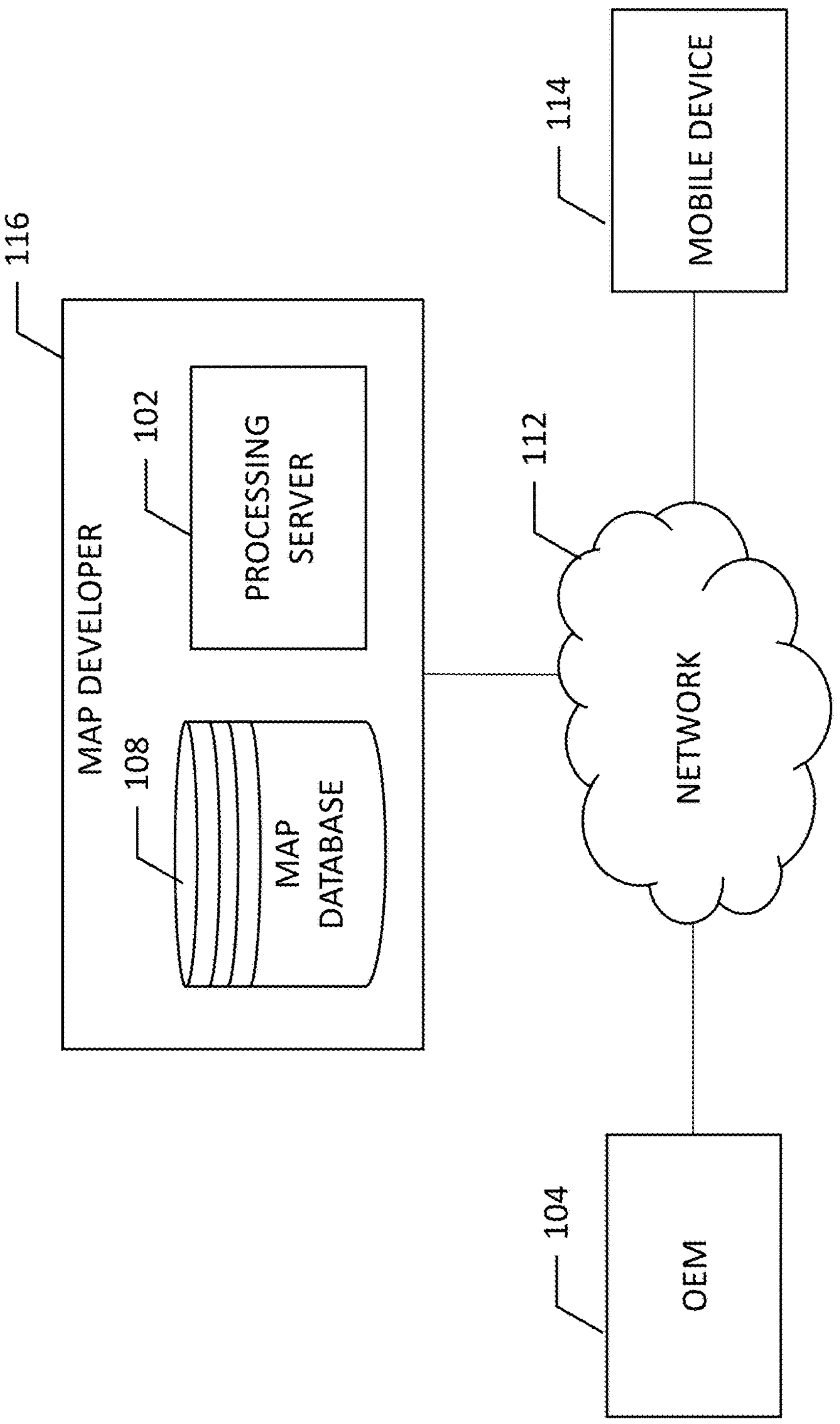
Figure 2:
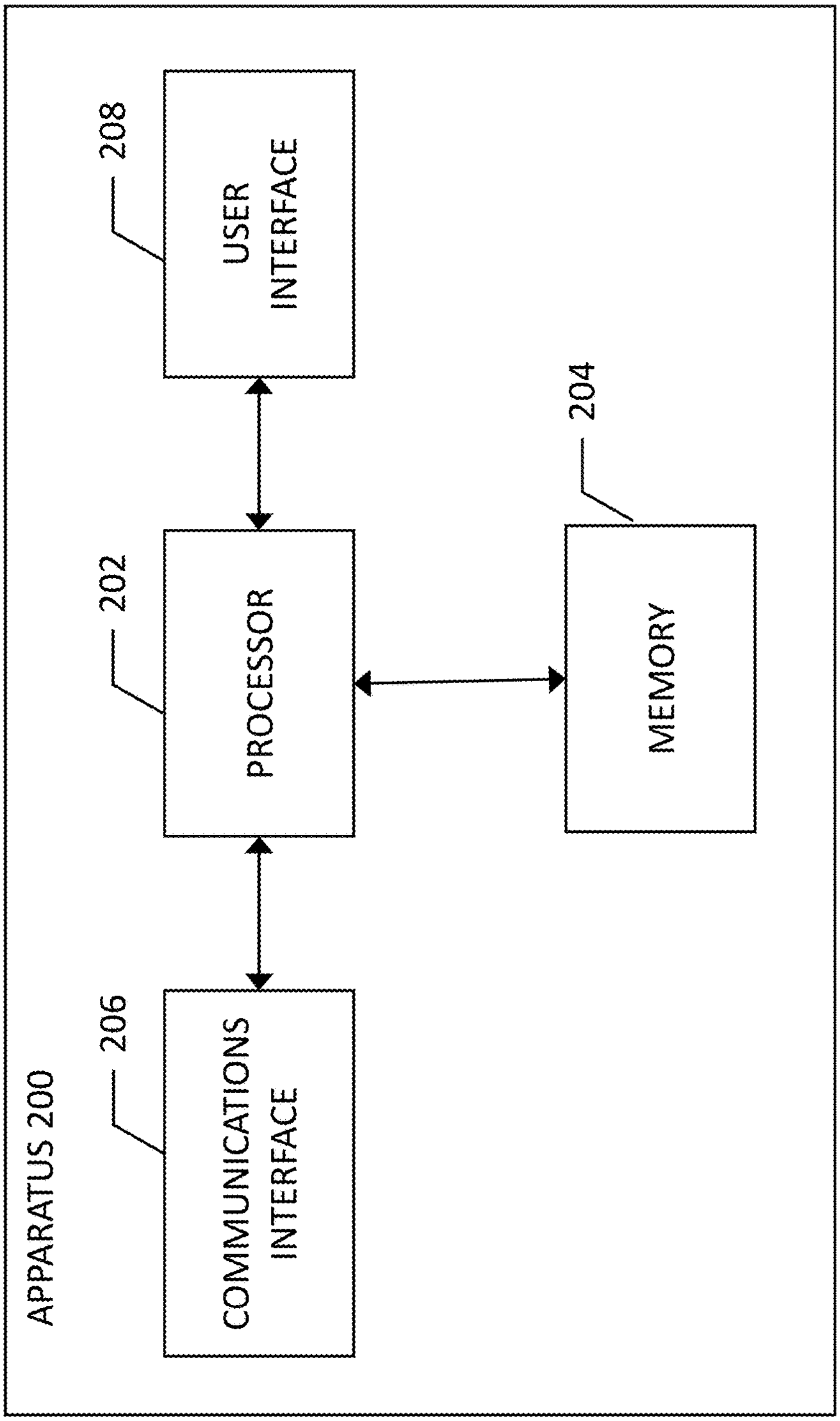
Figure 3:
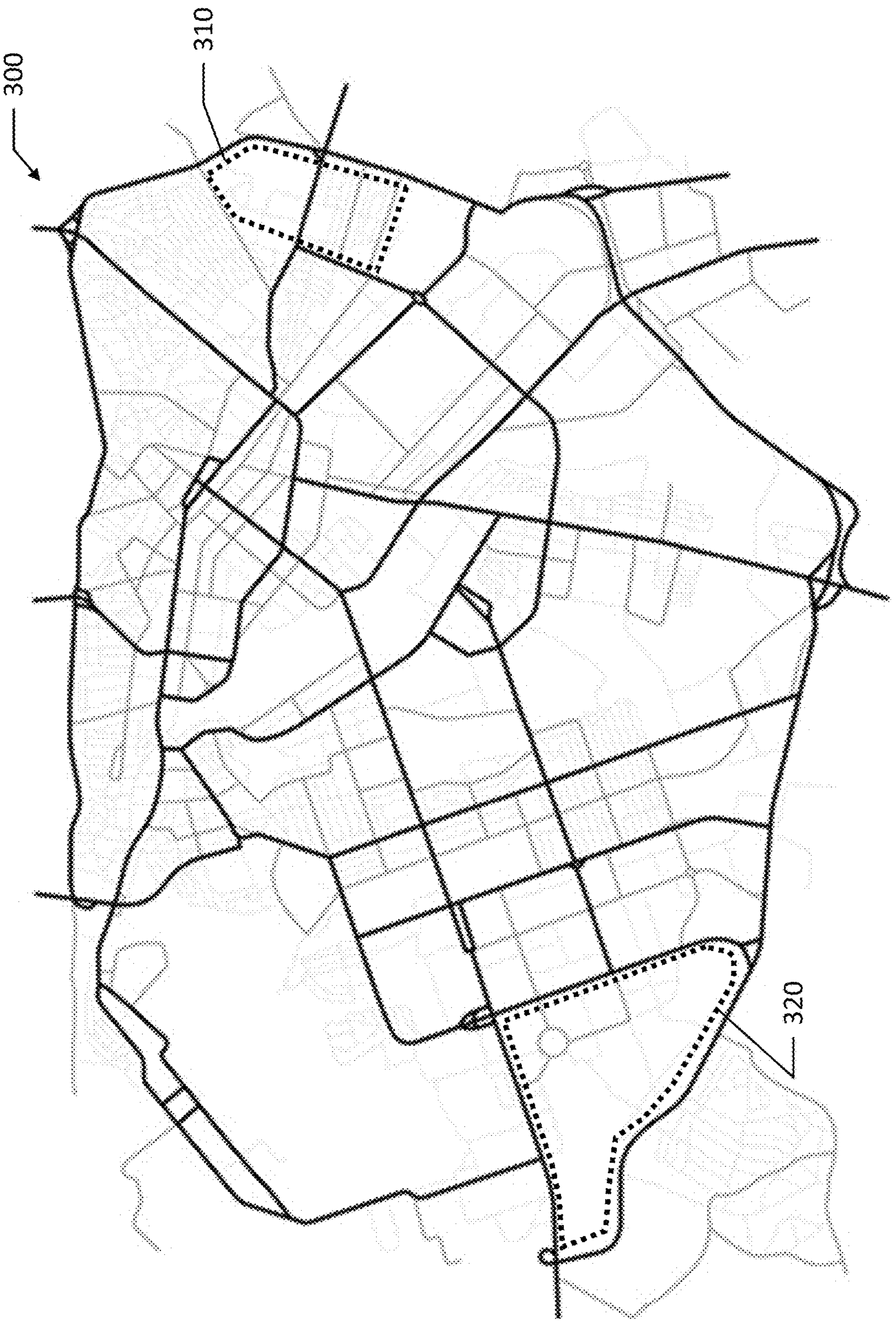
Figure 4:
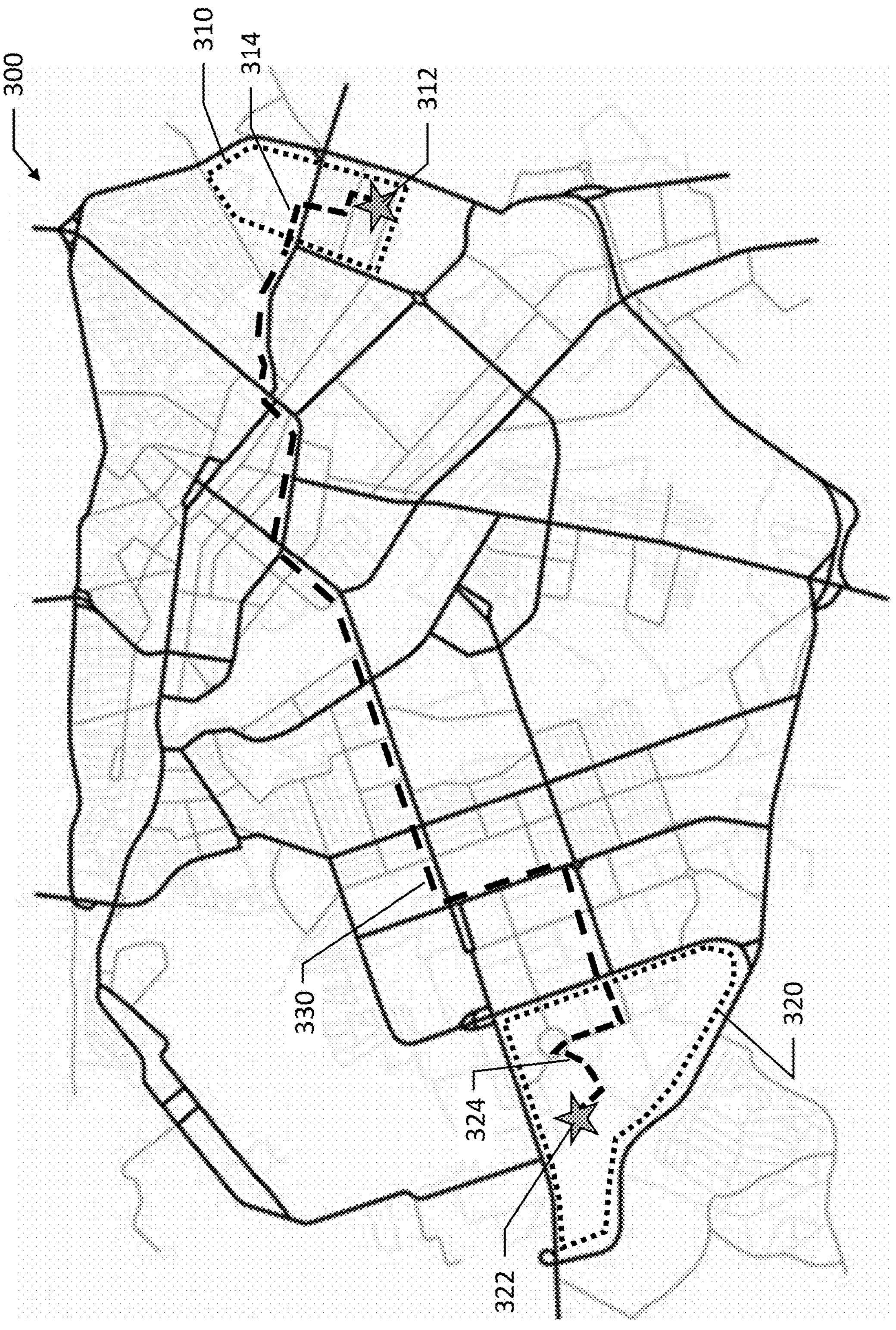
Figure 5:
Figure 6:
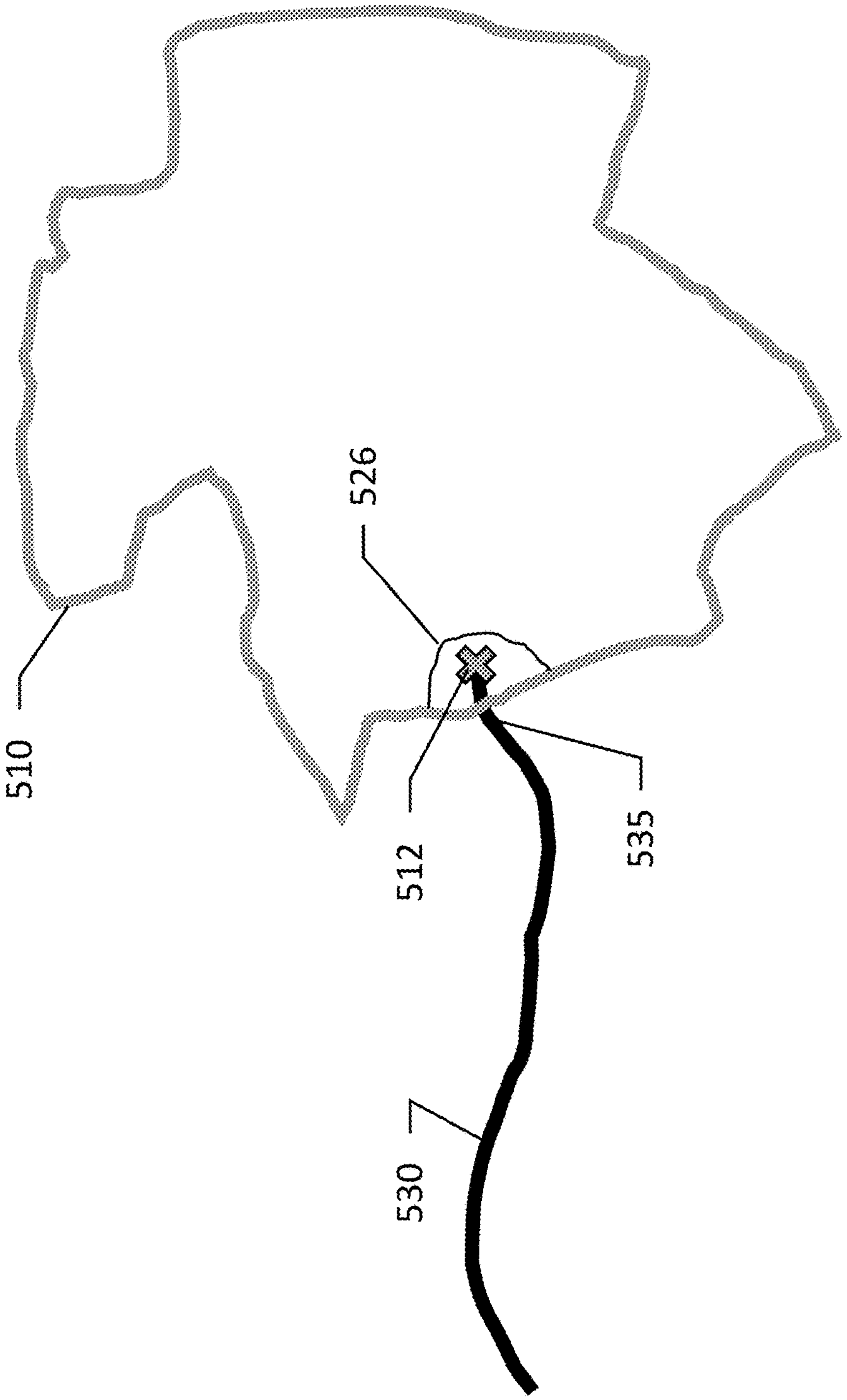
Figure 7:
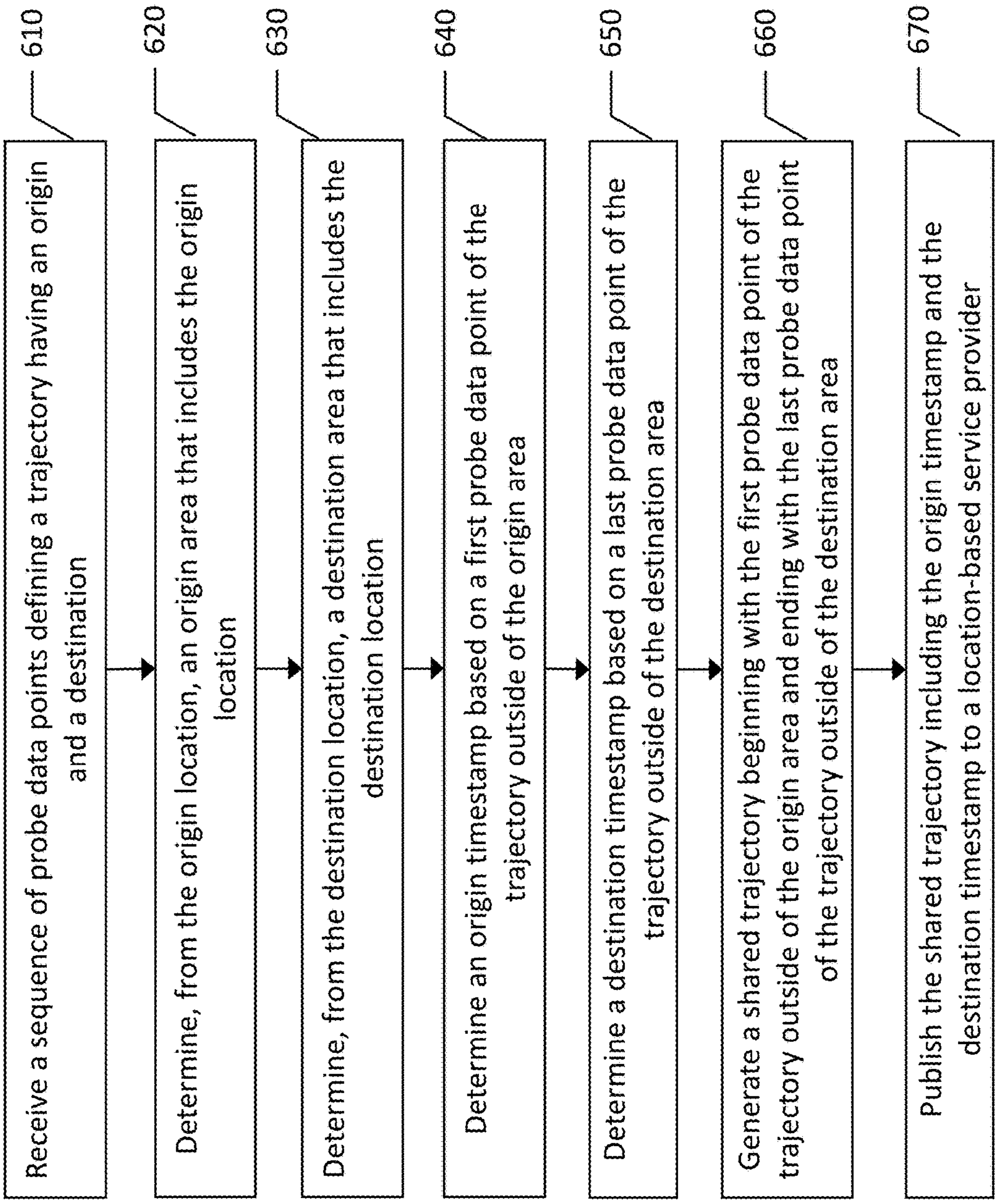

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data in accordance with an example embodiment of the present disclosure;

FIG. 3 illustrates a mapped area including an origin area and a destination area according to an example embodiment of the present disclosure;

FIG. 4 illustrates the mapped area of FIG. 3 with an origin within the origin area, a destination within the destination area, and a trajectory between the origin and destination according to an example embodiment of the present disclosure;

FIG. 5 illustrates another mapped area having an origin area adjacent to a destination area according to an example embodiment of the present disclosure;

FIG. 6 illustrates an origin area with an origin inside an inferred area based on timestamping of trajectory data according to an example embodiment of the present disclosure; and FIG. 7 is a flowchart of a method for anonymizing trajectory data while maintaining utility for multiple use cases according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

A method, apparatus, and computer program product are provided herein in accordance with an example embodiment for anonymizing trajectories of mobile devices, and more particularly, to anonymizing trajectories in a manner that reduces privacy risks while providing high utility for all use cases. Location-based services are useful to a variety of consumers who may employ location-based services for a wide range of activities. Services such as the identification of traffic density along road segments, providing information regarding goods and services available in a specific location, identifying commuting patterns, and identifying a target group of consumers in a particular location or who travel along a particular path, are among many other location-based services. While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which location information and more specifically, trajectory information can be gathered and shared in a manner that anonymizes the source of the information and makes unmasking of the source difficult.

Embodiments use only a portion of a trajectory of a user, where a trajectory is a path of a user between an origin and a destination, often identified by a number of time-stamped location points. Embodiments crop a portion at the beginning of the trajectory to mask the origin of the trajectory, and crop a portion at the end of the trajectory to mask the destination of the trajectory, thereby rendering it difficult to establish to whom the trajectory belongs while obtaining useful location-based trajectory information for use with location-based services.

While various anonymization strategies exist, they generally are typically tailored to a specific use case, for which they grant a certain level of utility while reducing privacy risks. Naively applying an anonymization strategy to a different use case can lead to increased privacy risks as well as reduced data utility for that use case. Location-based services (LBS), e.g. real-time traffic information, fleet management, navigation, are based on the analysis of trajectory data that users of such services provide. Location data can be used for multiple application use cases, e.g. traffic estimation, analysis of commuting patterns, etc. Exchanged location data must be anonymized to comply with regulation, but anonymization strategies are tailored to a specific use case and can reduce the utility of the data for use in another use case.

Applying multiple different anonymization strategies to the same, non-anonymized data can lead to high utility in multiple use cases, but can also lead to unexpected privacy risks that can arise from the combination of these datasets. By combining two datasets that have been produced from the same original dataset using two different anonymization strategies may lead to inference of more information about the original dataset than can be inferred from each individually anonymized dataset. For example, if one anonymization strategy anonymizes 20% of a dataset using a first technique, while a second anonymization strategy for a different use case anonymizes a different 20% of the dataset using the second technique, combining these two anonymized datasets may reveal 90% or more of the original dataset. Embodiments provided herein provide a tailored anonymization strategy that keeps privacy risks low while providing high utility for multiple use cases.

To provide an improved manner of anonymizing trajectories, a system as illustrated in FIG. 1 may be used. FIG. 1 illustrates a communication diagram of an example embodiment of a system for implementing example embodiments described herein. The illustrated embodiment of FIG. 1 includes a map developer 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. Further, data may be compiled relating to the existence of parking and parking space availability along different road segments of the map database, where a parking availability estimation may be generated in dependence of time of day, day of week, season of the year, special events, etc. Park-in and park-out events, may be established based on the assessment of whether a vehicle is performing a parking maneuver followed by a stop in movement of the probe (park-in) or a vehicle is performing a parking maneuver followed by continued movement of the probe (park-out), and the relative movement of vehicles performing park-in to performing park-out maneuvers can be used to estimate parking availability. Further, this data can be compiled for temporal clustering of epochs to estimate future parking availability. The navigation-related functions can correspond to vehicle navigation, pedestrian navigation, or other types of navigation.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for determining parking availability along road segments within regions of a map. Parking availability is described herein as whether or not parking spaces may be available (i.e., are not currently occupied). The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based services (LBS) such as real-time traffic information, fleet management, and navigation among others, are based on the analysis of trajectory data that users of such services provide. Trajectory data is associated with a privacy level and accuracy value. An accuracy value is based on the intrinsic utility of data toward the generation of location-based services. The privacy value reflects the sensitive information that trajectory data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, privacy-enhancing algorithms can be performed on trajectory data either by the location-based service provider, or by the entity gathering the trajectory data (e.g., an OEM). Privacy-enhancing algorithms function by removing or altering features of the data that may remove privacy, and this operation typically renders the data less accurate and thus less valuable for the location-based service provider.

Different location-based services have differing data needs for the service to be accurate and useful. For example, useful trajectory data that has a relatively high accuracy value for traffic estimation includes a spatiotemporal component of the data that is as precise as possible in order to map the trajectory data onto the correct road segment and correctly infer the state of traffic based on the behavior of the trajectory. Useful trajectory data that has a relatively high accuracy value for commuting pattern analysis includes a spatial component of the origin and destination, obscured to some degree. The origin and destination locations can be rounded to a relatively large area.

Currently, there are no anonymization strategies that provide high utility for both the use cases of traffic congestion estimation and analysis of commuting patterns. This leads either to increased privacy risks for the data subjects which produce the trajectory data, or low utility and accuracy values for the location-based service providers. Embodiments described herein provide an anonymization strategy that is suitable to release anonymized trajectory data that has high utility for both the traffic estimation and the commuting pattern analysis use cases.

Embodiments described herein release the middle portion of a trajectory as accurately as possible, such that the trajectory data can be used to generate accurate estimations of traffic congestion as well as releasing the origin and destination of the trajectory as coarse spatiotemporal locations which enable accurate analysis of commuting patterns. The privacy risks are reduced by computing the coarse spatiotemporal locations of the origin and destination in a manner that is not revealing of the actual origin and destination, even when combined to the information about the portion of the trajectory between the coarse origin and destination.

Embodiments described herein provide privacy to users of location-based services by adding uncertainty regarding the origin and destination of trajectory data of the user. An origin and destination, separately or as a pair, can reveal sensitive locations regarding the user that generated the trajectory data, such as a home location and/or a work location, and identification of an origin, a destination, or both, may render the identity of the individual user relatively easy to obtain. Trajectory data as described herein is defined as a set of data points, each data point including a location and a timestamp. The location may be in the form of latitude and longitude, and potentially altitude. Additional information may be associated with a data point, such as a timestamp (or approximate time stamp), speed, heading, etc.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by cropping the trajectories through removal of the initial and final sections of the trajectory in order to introduce uncertainty about the actual origin and destination of the trajectory. If a trajectory includes additional sensitive points (e.g., stopping for a period of time at a location such as a hospital), the same approach can be applied to sub-trajectories to crop portions of a trajectory around a potentially sensitive location or stay point within a trajectory. To maximize the utility of the data thereby improving the location-based services provided by the service provider, embodiments described herein identify a suitable location where to crop the trajectory based on an analysis of the trajectory.

While the cropping of trajectories can be performed using a constant temporal threshold (e.g., delete data until 2 minutes after start) or using a speed threshold (e.g., delete data until after the vehicle reaches a speed of 30 miles-per-hour), such embodiments can perform poorly in many circumstances. For example, a vehicle leaving a parking lot into a congested road, as a slow-moving vehicle would not get far from the parking lot within the temporal threshold. Leaving a parking lot into a high speed road would reach a speed threshold very quickly enabling identification of the origin of the trajectory. Leaving a farm in a rural area, where population density is much lower than in a city and therefore uncertainty about the origin of the trajectory would be much lower than desired (e.g., if the road segment where the trajectory starts leads to only a handful of residential units). Embodiments described herein solve these issues through a unique method of cropping trajectories. Embodiments described herein introduce uncertainty in what is the origin and destination of a trajectory while avoiding unnecessary degradation of the data.

As noted above, different use cases have differing trajectory data needs to be effective. Traffic density estimation benefits from a spatiotemporal component that is as accurate as possible in order to identify where traffic his heavy along road segments inferred from behavior of the trajectory data with respect to time. Commuting pattern analysis benefits from the spatial component of the origin and destination, which can be rounded to a relatively large area, such as the size of a zip code or neighborhood, while the temporal area can be rounded to an arbitrary time window (e.g., one hour). The connection between the origin and destination should remain accurate for commuting pattern analysis.

Stay points, as defined herein, are spatiotemporal locations where a vehicle stops for a relatively long period of time, which corresponds to an activity, such as an activity outside of the vehicle. Stay points can include reaching the destination, refueling, shopping, meeting/appointments, etc. All of these activities may reveal personal information about the vehicle occupant(s). Stay points can optionally be identified based on a context. For example, stopping for two minutes at a location corresponding to a bank may be inferred as a stay point (e.g., revealing where a user banks or collects money from an Automated Teller Machine), while stopping for two minutes at a busy traffic signal interchange may not be inferred as a stay point.

The algorithm of example embodiments described herein uses trajectory information that is not anonymized as input. The trajectory can be split into trips, where trips are sub-trajectories between stay points. The algorithm can verify that there are no stay points within these sub-trajectories, and if a stay-point exists, further dividing the sub-trajectory accordingly. Stay-points can be detected using information from the map, such as the presence of residential buildings. Stay-points can optionally be informed based on the use of a mobile device of a user. For example, if a user conducts a transaction on their mobile device, such as a mobile pay purchase while the vehicle is stopped, the stop may be inferred as a stay-point.

Each of these stay-points that reflect the beginning and end of sub-trajectories can be identified as an origin where a sub-trajectory begins, or a destination where a sub-trajectory ends. For purposes of anonymization as described herein, each of these sub-trajectories can be referred to as trajectories with respective origins and destinations. The algorithm of example embodiments generalizes the origin and destination location for each trajectory. This generalization involves the generation of coarse spatial coordinates or the origin and the destination of the trajectory based on business requirements. For example, an area corresponding to a zip code can be the generalization for an origin location within that zip code. Optionally, the coordinates for origin and destination can be informed using map information. For example, the geographic area within which the origin and destination are found can be divided based on features of the maps, such as rivers, roads of the road network, geographical boundaries (e.g., country borders), or the like. Optionally, the generalization involves employing a grid or tessellation of a geographic region. The grid or tessellation can be of fixed size cells or variable sized cells. For example, some grid cells can be further subdivided by a grid to refine coordinates. The coordinates can be refined using map information, such as multiple areas can be combined if the number of buildings in an area is below a predefined threshold. The coordinates can be refined within an area based on population counts of the area (e.g., from census information, cellular service provider information, etc.), point-of-interest counts, area zoning (e.g., commercial, residential, industrial, agricultural, etc.). For example, in a densely populated urban residential area, refinement of the coordinates may involve a relatively small area, since so many people share that same area and it may not substantially compromise privacy.

According to some embodiments, a user may be able to mark certain areas (e.g., grid cells, postal codes, etc.) as privacy sensitive such that location information within those areas are always obscured (e.g., dropped without publication). Areas that include such features as a child's school, a user's home or work location, or the like. A user may optionally select certain areas to not be privacy sensitive if location-based service accuracy and performance is prioritized.

FIG. 3 illustrates an example of a mapped area 300 including an origin area 310 within which the origin location is found, and a destination area 320 within which the destination location is found. The origin area and the destination area can be informed by some or all of the information described above with respect to the underlying map data. The destination area 320 may be relatively larger than the origin area 310 if the destination area is one or more of less populated, has fewer buildings, or has a different zoning, for example.

Upon establishing the origin area 310 and the destination area 320, the trajectory data is prepared to be released together with the origin area and destination area. FIG. 4 illustrates the map of FIG. 3 with an origin 312 within the origin area 310, a destination 322 within the destination area 320, and a trajectory 330 between the origin and destination. Once the spatial coordinates for the origin 312 and destination 322 are defined along with the origin area 310 and destination area 320, the set of trajectory points included in these areas are eliminated from the trajectory information that is to be shared. The trajectory 330 includes an origin portion 314 and a destination portion 324. The origin portion 314 is the portion of the trajectory 330 within the origin area 310, while the destination portion 324 is the portion of the trajectory within the destination area. The origin portion 314 and the destination portion 324 are cropped to avoid revealing the specific origin and destination of the trajectory.

According to some embodiments, a trajectory may exit an origin area and enter it again later on the trajectory. A strategy to maximize utility is to drop only the points of the trajectory before the first exit from the origin area, while the points of the trajectory within the origin area after re-entry are kept. A strategy that maximizes privacy is to drop the points of the trajectory before the last exit from the origin area. These same strategies can be applied to the destination by dropping all points after the first or last point that enters the destination.

In some instances, as depicted in the mapped area 400 of FIG. 5, the origin area 410 for the origin 412 and the destination area 420 for the destination 422 may be adjacent or touching, such that the trajectory 430 does not have a portion between the origin area and the destination area. In such an embodiment, all points of the trajectory may be dropped and the trajectory not shared or published. In an embodiment in which the origin area and the destination area are shared (within the same area), then all points of the trajectory may also be dropped and the trajectory not shared.

In addition to obfuscating the origin and destination using the origin area and destination area described above, the origin and destination timestamps are generalized to further anonymize the trajectory. The actual origin and destination timestamps should be generalized to a certain level, though if this is performed based on a fixed grid (e.g., 9:00.00-9:59.99, 10:00.00-10:59.99, etc.), there can arise situations in which the information revealed by the points in the trajectory can disclose information about the origin and destination. FIG. 6 illustrates such an example embodiment where an origin area 510 defined by a zip code, for example, includes the actual origin 512 location. If the actual origin departure time is, for example, 10:01 am, and the first timestamp of the first shared point 535 of the trajectory 530 occurs at 10:02 am, since timestamps are generalized to within hour blocks, the origin can be presumed to be within two minutes travel time of the exit point from the origin area, or within inferred area 526.

Embodiments described herein provide a mechanism to generalize the origin and destination timestamps such that they remain useful and accurate, while also provide privacy. Instead of generalizing the real origin and destination timestamps, embodiments generalize a timestamp of a first probe data point and last probe data point of the trajectory that is to be shared. In such an embodiment, the same time grid is introduced for all trajectories and determine into which cell the aforementioned generalized timestamp falls. This solution provides an efficient method of introducing privacy since there is no additional data about the real origin or destination being shared. However, in some cases this approach can compromise utility by returning a generalized time that is not representative of the actual time, such as if there is a long delay between the actual origin and the first published point of the trajectory. To improve upon this, another approach for timestamp generalization is implemented.

To further improve utility of the probe data with generalized timestamps, a time window is defined based on a time of the first point of the trajectory data that falls outside of the origin area and one time window based on the time of the last point outside of the destination area. For example, the first point with a timestamp of 10:10 and the time window size is 30 minutes, a series of time windows ending at 10:01 and a size of 30 minutes are defined: 9:31-10:01, 9:01-9:31, 8:31-9:01, . . . . The same is performed for the last point with a timestamp of 11:24, defining time windows: 11:24-11:54, 11:54-12:24, . . . . In case all points of the trajectory have been dropped, such as is the case with FIG. 5, two random points near the actual origin and destination can be selected to define the temporal components of the origin and destination areas. The defined windows within which the actual origin and destination fall are identified. For example, an origin with a timestamp of 9:12 falls in the time window of 9:01-9:31, while a destination with a timestamp of 11:31 falls in the time window 11:24-11:54.

Optionally, further anonymization can be performed by using splitting and gapping, which works by breaking the connection between the stay points in a trajectory, which introduce re-identification risks. While embodiments described above seek to release origin and destination together (or at least probe data points just outside of corresponding origin and destination areas), the generalization in space and time for the origin and destination introduces enough uncertainty about the actual origin and destination to reduce privacy risks. The trajectory can be released for further anonymization to maximize utility for the traffic use case. Optionally, splitting and gapping can be applied to this trajectory data, where the trajectory is divided into multiple segments which have different segment identifiers and are separated by gaps. When applying splitting and gapping, the segment identifier of the first and last segments do not need to be changed for the anonymized trajectory, as these points are easily relatable with the origin and destination as their time component is related and the points are located at the edge of the origin area and destination area, respectively. Given that the origin and destination must remain associated to achieve the utility described herein (e.g., having the same identifier for the commuting use case), the anonymization should rotate the IDs of all segments except the first and last segments.

The origin and destination as spatiotemporal coordinates can be released as the first probe data point outside of the origin area and the last probe data point outside of the destination area, using the temporal component defined above, together with the remaining trajectory points therebetween. This data can be released to location-based service providers such that they can provide useful and accurate location-based services. The release or publication of the origin, destination, and trajectory can be performed by an update of a trajectory database, for example. The release or publication can include the transmission of the data over an Application Programming Interface (API) to a location-based service provider. The release or publication optionally includes generating a dataset listing (e.g., for a data marketplace) including the trajectory data.

Once the trajectories are anonymized using the process described herein, the anonymization level or privacy level of each trajectory can be measured to implement further mitigations. For example, the k-anonymity level of each trajectory can be measured, and trajectories with an anonymity level below a predefined measure can be dropped and not published to a location-based service provider. The privacy level can be established based, for example, on comparing origin-destination pairs, comparing the middle parts of the trajectories, or both. In each case, k-anonymity is measured by counting how many other trajectories at least partially overlap with the origin, destination, or both of a single trajectory.

Embodiments described herein provide a mechanism by which data that is valuable to both temporally-sensitive traffic use cases, and to location accuracy-sensitive commuting pattern analysis. Generally, these two use cases have different priorities such that a single anonymization strategy generally does not produce satisfactory results for both use cases. However, embodiments provided herein are tailored to provide both location accuracy and spatiotemporal accuracy, while providing sufficient anonymization for the source of the trajectory. Privacy risks are thereby minimized and mitigated.

Embodiments compute privacy metrics for the data such that this information can be used to apply further mitigations. Embodiments combine anonymization requirements such that utility is maximized where origin and destination are not cut from the released probe data as they are already removed as part of the origin/destination anonymization using the origin area and destination area. Embodiments enable measurement of which start/end cut is sufficient to achieve a sufficient level of k-anonymity such that the loss of utility is always justified as it indeed provides privacy. In contrast to conservative start/end cuts that sometimes result in lost utility without significant improvement in privacy protection. Embodiments provide two alternative ways of optimizing which offer a trade-off between computational cost and utility.

FIG. 7 illustrates a flowchart depicting a method according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method of anonymizing trajectories of mobile devices, and more particularly, to pruning or cropping of a beginning and an end of a trajectory between an origin and a destination to remove identifiable information from the trajectory. A sequence of probe data points defining a trajectory having an origin and a destination are received at 610. These may be received, for example, from a vehicle traveling within a road network of a geographical region and the vehicle may operate as mobile device 114 of FIG. 1. An origin area is determined based on the origin location at 620, while a destination area is determined based on the destination location at 630. An origin timestamp is determined at 640 based on a first probe data point of the trajectory outside of the origin area. A destination timestamp is determined at 650 based on a last probe data point of the trajectory outside of the destination area. A shared trajectory is generated at 660 beginning with the first probe data point of the trajectory outside of the origin area and ending with the last probe data point of the trajectory outside of the destination area. The shared trajectory is published to a location-based service provider at 670 including the origin timestamp and the destination timestamp. This published trajectory provides utility to both traffic services and to commute familiarity services, while not compromising the identity of the source of the trajectory.

In an example embodiment, an apparatus for performing the method of FIG. 7 above may include a processor (e.g., the processor 202) configured to perform some or each of the operations (610-670) described above. The processor may, for example, be configured to perform the operations (610-670) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-670 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, cause the apparatus to at least:

receive a sequence of probe data points defining a trajectory having an origin location and a destination location;

determine, from the origin location, an origin area that includes the origin location, wherein the origin area and a respective size thereof are automatically determined based on underlying map data including one or more of a population density, a building density, or a zoning;

determine, from the destination location, a destination area that includes the destination location, wherein the destination area and a respective size thereof are automatically determined based on underlying map data including one or more of a population density, a building density, or a zoning;

determine an origin timestamp based on a first probe data point of the trajectory outside of the origin area, wherein the origin timestamp is determined based on a generalization of an actual timestamp of the first probe data point of the trajectory outside of the origin area;

determine a destination timestamp based on a last probe data point of the trajectory outside of the destination area, wherein the destination timestamp is determined based on a generalization of an actual timestamp of the last probe data point of the trajectory outside of the destination area;

generate a shared anonymized trajectory beginning with the first probe data point of the trajectory outside of the origin area and ending with the last probe data point of the trajectory outside of the destination area, omitting probe data points corresponding to locations within the origin area and within the destination area; and publish the shared anonymized trajectory including the origin timestamp and the destination timestamp to a location-based service provider.

2. The apparatus of claim 1, wherein the generalization of the actual timestamp of the first probe data point of the trajectory outside of the origin area comprises assigning the origin timestamp to a window of time that includes the actual timestamp of the first probe data point of the trajectory outside of the origin area, and wherein the generalization of the actual timestamp of the last probe data point of the trajectory outside of the destination area comprises assigning the destination timestamp to a window of time that includes the actual timestamp of the last probe data point of the trajectory outside of the destination area.

3. The apparatus of claim 1, wherein the generalization of the actual timestamp of the first probe data point of the trajectory outside of the origin area comprises causing the apparatus to define a time window based on the actual timestamp of the first probe data point of the trajectory outside of the origin area, wherein the origin timestamp comprises the time window.

4. The apparatus of claim 1, wherein causing the apparatus to determine, from the origin location, the origin area that includes the origin location comprises causing the apparatus to:

determine candidate origin areas for a region based, at least in part, on a density of at least one of population, points-of-interest, or buildings; and determine the origin area from the candidate origin areas based on the origin location.

5. The apparatus of claim 1, wherein causing the apparatus to determine, from the origin location, the origin area that includes the origin location comprises causing the apparatus to:

determine candidate origin areas for a region based, at least in part, on map features comprising one or more of: geographical boundaries; topographical boundaries; roads of a road network; bodies of water, or postal codes; and determine the origin area from the candidate origin areas based on the origin location.

6. The apparatus of claim 1, wherein causing the apparatus to determine, from the destination location, the destination area that includes the destination location comprises causing the apparatus to:

determine candidate destination areas for a region based, at least in part, on map features comprising one or more of: geographical boundaries; topographical boundaries; roads of a road network; bodies of water, or postal codes; and determine the destination area from the candidate destination areas based on the destination location.

7. The apparatus of claim 1, wherein causing the apparatus to publish the shared trajectory including the origin timestamp and the destination timestamp to a location-based service provider comprises causing the apparatus to publish the shared trajectory including the origin timestamp and the destination timestamp using an Application Programming Interface (API) to the location-based service provider.

8. The apparatus of claim 1, wherein generating the shared trajectory further comprises:

anonymizing the shared trajectory using an anonymization technique to generate an anonymized shared trajectory; and measuring an anonymization level of the anonymized shared trajectory;

wherein causing the apparatus to publish the shared trajectory comprises causing the apparatus to publish the anonymized shared trajectory in response to the anonymization level of the anonymized shared trajectory satisfying a minimum anonymization level.

9. The apparatus of claim 8, wherein the anonymization level is measured based on k-anonymity.

10. A computer program product comprising at least one non-transitory computer-readable storage medium having computer-executable program code portions stored therein, the computer-executable program code portions comprising program code instructions configured to:

receive a sequence of probe data points defining a trajectory having an origin location and a destination location;

determine, from the origin location, an origin area that includes the origin location, wherein the origin area and a respective size thereof are automatically determined based on underlying map data including one or more of a population density, a building density, or a zoning;

determine, from the destination location, a destination area that includes the destination location, wherein the destination area and a respective size thereof are automatically determined based on underlying map data including one or more of a population density, a building density, or a zoning;

determine an origin timestamp based on a first probe data point of the trajectory outside of the origin area, wherein the origin timestamp is determined based on a generalization of an actual timestamp of the first probe data point of the trajectory outside of the origin area;

determine a destination timestamp based on a last probe data point of the trajectory outside of the destination area, wherein the destination timestamp is determined based on a generalization of an actual timestamp of the last probe data point of the trajectory outside of the destination area;

generate a shared trajectory beginning with the first probe data point of the trajectory outside of the origin area and ending with the last probe data point of the trajectory outside of the destination area, omitting probe data points corresponding to locations within the origin area and within the destination area; and publish the shared trajectory including the origin timestamp and the destination timestamp to a location-based service provider.

11. The computer program product of claim 10, wherein the generalization of the actual timestamp of the first probe data point of the trajectory outside of the origin area comprises assigning the origin timestamp to a window of time that includes the actual timestamp of the first probe data point of the trajectory outside of the origin area, and wherein the generalization of the actual timestamp of the last probe data point of the trajectory outside of the destination area comprises assigning the destination timestamp to a window of time that includes the actual timestamp of the last probe data point of the trajectory outside of the destination area.

12. The computer program product of claim 10, wherein the generalization of the actual timestamp of the first probe data point of the trajectory outside of the origin area comprise program code instructions to define a time window based on the actual timestamp of the first probe data point of the trajectory outside of the origin area, wherein the origin timestamp comprises the time window.

13. The computer program product of claim 10, wherein the program code instructions to determine, from the origin location, the origin area that includes the origin location comprise program code instructions to:

determine candidate origin areas for a region based, at least in part, on a density of at least one of population, points-of-interest, or buildings; and determine the origin area from the candidate origin areas based on the origin location.

14. The computer program product of claim 10, wherein the program code instructions to determine, from the origin location, the origin area that includes the origin location comprise program code instructions to:

determine candidate origin areas for a region based, at least in part, on map features comprising one or more of: geographical boundaries; topographical boundaries; roads of a road network; bodies of water, or postal codes; and determine the origin area from the candidate origin areas based on the origin location.

15. The computer program product of claim 10, wherein the program code instructions to determine, from the destination location, the destination area that includes the destination location comprise program code instructions to:

determine candidate destination areas for a region based, at least in part, on map features comprising one or more of: geographical boundaries; topographical boundaries, roads of a road network; bodies of water, or postal codes; and determine the destination area from the candidate destination areas based on the destination location.

16. A method comprising:

receiving a sequence of probe data points defining a trajectory having an origin location and a destination location;

determining, from the origin location, an origin area that includes the origin location, wherein the origin area and a respective size thereof are automatically determined based on underlying map data including one or more of a population density, a building density, or a zoning;

determining, from the destination location, a destination area that includes the destination location, wherein the destination area and a respective size thereof are automatically determined based on underlying map data including one or more of a population density, a building density, or a zoning;

determining an origin timestamp based on a first probe data point of the trajectory outside of the origin area, wherein the origin timestamp is determined based on a generalization of an actual timestamp of the first probe data point of the trajectory outside of the origin area;

determining a destination timestamp based on a last probe data point of the trajectory outside of the destination area, wherein the destination timestamp is determined based on a generalization of an actual timestamp of the last probe data point of the trajectory outside of the destination area;

generating a shared trajectory beginning with the first probe data point of the trajectory outside of the origin area and ending with the last probe data point of the trajectory outside of the destination area, omitting probe data points corresponding to locations within the origin area and within the destination area; and publishing the shared trajectory including the origin timestamp and the destination timestamp to a location-based service provider.

17. The method of claim 16, wherein the generalization of the actual timestamp of the first probe data point of the trajectory outside of the origin area comprises assigning the origin timestamp to a window of time that includes the actual timestamp of the first probe data point of the trajectory outside of the origin area, and wherein the generalization of the actual timestamp of the last probe data point of the trajectory outside of the destination area comprises assigning the destination timestamp to a window of time that includes the actual timestamp of the last probe data point of the trajectory outside of the destination area.

18. The method of claim 16, wherein the generalization of the actual timestamp of the first probe data point of the trajectory outside of the origin area comprises defining a time window based on the actual timestamp of the first probe data point of the trajectory outside of the origin area, wherein the origin timestamp comprises the time window.

19. The method of claim 16, wherein determining, from the origin location, the origin area that includes the origin location comprises:

determining candidate origin areas for a region based, at least in part, on a density of at least one of population, points-of-interest, or buildings; and determining the origin area from the candidate origin areas based on the origin location.

20. The method of claim 16, wherein determining, from the origin location, the origin area that includes the origin location comprises:

determining candidate origin areas for a region based, at least in part, on map features comprising one or more of: geographical boundaries; topographical boundaries; roads of a road network; bodies of water, or postal codes; and determining the origin area from the candidate origin areas based on the origin location.

* * * * *